US006375906B1

(12) United States Patent
Edlund et al.

(10) Patent No.: US 6,375,906 B1
(45) Date of Patent: Apr. 23, 2002

(54) STEAM REFORMING METHOD AND APPARATUS INCORPORATING A HYDROCARBON FEEDSTOCK

(75) Inventors: David J. Edlund; Thomas G. Herron, both of Bend, OR (US)

(73) Assignee: IdaTech, LLC, Bend, OR (US)

(*) Notice: Subject to any disclaimer, the term of this patent is extended or adjusted under 35 U.S.C. 154(b) by 0 days.

(21) Appl. No.: 09/636,250

(22) Filed: Aug. 10, 2000

Related U.S. Application Data

(60) Provisional application No. 60/148,520, filed on Aug. 12, 1999.

(51) Int. Cl.[7] .................................................. B01J 8/00
(52) U.S. Cl. .................. 422/189; 422/105; 422/198; 422/200; 422/202; 422/208; 48/127.9; 429/24; 429/25; 429/26
(58) Field of Search .................. 48/127.9; 422/189, 422/198, 200, 202, 204, 208, 105, 108, 110, 111, 112; 429/17, 19, 20, 22, 24, 25, 26, 34

(56) References Cited

U.S. PATENT DOCUMENTS

| 3,094,391 A | 6/1963 | Mader |
| 3,144,312 A | 8/1964 | Mertens |
| 3,338,681 A | 8/1967 | Kordesch |

(List continued on next page.)

FOREIGN PATENT DOCUMENTS

| EP | 1065741 A2 | 1/2001 |
| WO | WO 97/25649 | 7/1997 |
| WO | WO 99/65097 | 12/1999 |

OTHER PUBLICATIONS

English abstract of Japanese Patent No. 432150, 1992.
English abstract of Japanese Patent No. 513230, 1993.
English abstract of Japanese Patent No. 514790, 1993.
English abstract of Japanese Patent No. 604070, 1994.
English abstract of Japanese Patent No. 634540. Date Unknown.
English abstract of Japanese Patent No. 710910, 1995.
English abstract of Japanese Patent No. 828793, 1996.
English abstract of Japanese Patent No. 6176779, 1994.
English abstract of Great Britain Patent No. 2,305,186. Date unknown.
Adris, A. M., et al., "A Fluidized Bed Membrane Reactor for the Steam Reforming of Methane," The Canadian Journal of Chemical Engineering, vol. 69, pp. 1061–1070 (Oct. 1991).
Chai, M., et al., "Promotion of Methane Steam Reforming Using Ruthenium–Dispersed Microporous Alumina Membrane Reactor," Chemistry Letters, The Chemical Society of Japan, pp. 41–44 (1993).

(List continued on next page.)

Primary Examiner—Jerry D. Johnson
Assistant Examiner—Frederick Varcoe
(74) Attorney, Agent, or Firm—Kolisch Hartwell Dickinson McCormack & Heuser, PC

(57) ABSTRACT

A fuel processing assembly adapted to produce hydrogen gas from a carbon-containing feedstock. The fuel processing assembly includes a fuel processor, such as a steam reformer. The fuel processing assembly further includes a feed assembly adapted to deliver a carbon-containing feedstock, such as a hydrocarbon, to the fuel processor. In some embodiments, the fuel processing system includes a fuel cell stack that includes at least one fuel cell adapted to produce electrical power from hydrogen gas produced by the fuel processor.

66 Claims, 3 Drawing Sheets

U.S. PATENT DOCUMENTS

| | | |
|---|---|---|
| 3,350,176 A | 10/1967 | Green et al. .................. 422/109 |
| 3,450,500 A | 6/1969 | Setzer et al. |
| 3,469,944 A | 9/1969 | Bocard et al. |
| 3,524,819 A | 8/1970 | Guerrieri |
| 3,782,904 A | 1/1974 | Fletcher ....................... 422/222 |
| 3,787,038 A | 1/1974 | Tesner et al. ................ 266/266 |
| 3,920,416 A | 11/1975 | Houseman ..................... 48/95 |
| 3,955,941 A | 5/1976 | Houseman et al. ............. 48/95 |
| 3,982,910 A | 9/1976 | Houseman et al. ............. 48/61 |
| 4,003,343 A | 1/1977 | Lee ............................... 127/3 |
| 4,098,959 A | 7/1978 | Fanciullo |
| 4,098,960 A | 7/1978 | Gagnon |
| 4,127,393 A | 11/1978 | Timmins et al. |
| 4,238,403 A * | 12/1980 | Pinto ........................... 518/704 |
| 4,302,177 A | 11/1981 | Fankhanel et al. |
| 4,315,893 A | 2/1982 | McCallister |
| 4,387,434 A | 6/1983 | Moncrief, Jr. et al. |
| 4,400,182 A | 8/1983 | Davies et al. |
| 4,430,304 A | 2/1984 | Spurrier et al. |
| 4,466,253 A | 8/1984 | Jaster |
| 4,472,176 A | 9/1984 | Rubin |
| 4,504,447 A | 3/1985 | Spurrier et al. |
| 4,533,607 A | 8/1985 | Serderquist ................... 429/13 |
| 4,567,857 A | 2/1986 | Houseman et al. ............. 123/3 |
| 4,657,828 A | 4/1987 | Tajima ........................ 429/12 |
| 4,684,581 A | 8/1987 | Struthers |
| 4,713,234 A | 12/1987 | Weirich et al. |
| 4,788,004 A | 11/1988 | Pinto et al. ................... 252/373 |
| 4,838,897 A | 6/1989 | Amano et al. |
| 4,849,187 A | 7/1989 | Uozu et al. |
| 4,880,040 A | 11/1989 | Pierson et al. |
| 4,981,676 A | 1/1991 | Minet et al. ................. 423/652 |
| 5,030,661 A | 7/1991 | Lywood |
| 5,229,102 A | 7/1993 | Minet et al. |
| 5,326,550 A | 7/1994 | Adris et al. |
| 5,354,547 A | 10/1994 | Rao et al. ................... 423/650 |
| 5,382,271 A | 1/1995 | Ng et al. |
| 5,399,323 A | 3/1995 | Paisley et al. ............... 423/170 |
| 5,401,589 A * | 3/1995 | Palmer et al. ................. 429/13 |
| 5,417,051 A | 5/1995 | Ankersmit et al. |
| RE35,002 E | 7/1995 | Matsubara et al. ........... 429/12 |
| 5,458,857 A | 10/1995 | Collins et al. |
| 5,527,632 A | 6/1996 | Gardner ....................... 429/27 |
| 5,616,430 A | 4/1997 | Aoyama ...................... 429/17 |
| 5,637,259 A | 6/1997 | Galuszka et al. |
| 5,639,431 A | 6/1997 | Shirasaki et al. |
| 5,658,681 A | 8/1997 | Sato et al. .................... 429/13 |
| 5,677,073 A | 10/1997 | Kawatsu ....................... 429/22 |
| 5,741,474 A | 4/1998 | Isomura et al. |
| 5,741,605 A | 4/1998 | Gillett et al. |
| 5,858,314 A | 1/1999 | Hsu et al. |
| 5,861,137 A | 1/1999 | Edlund |
| 5,888,273 A | 3/1999 | Buxbaum ...................... 95/56 |
| 5,897,766 A | 4/1999 | Kawatsu ..................... 204/426 |
| 5,897,970 A | 4/1999 | Isomura et al. |
| 5,932,181 A | 8/1999 | Kim et al. ................... 422/188 |
| 5,985,474 A | 11/1999 | Chen et al. ................... 429/17 |
| 5,997,594 A * | 12/1999 | Edlund et al. ................ 48/76 |
| 6,007,931 A | 12/1999 | Fuller et al. |
| 6,042,956 A | 3/2000 | Lenel |
| 6,045,772 A | 4/2000 | Szydlowski et al. ........ 423/652 |
| 6,045,933 A * | 4/2000 | Okamoto ..................... 429/17 |
| 6,077,620 A | 6/2000 | Pettit |
| 6,083,637 A | 7/2000 | Walz et al. |
| 6,103,411 A | 8/2000 | Matsubayashi et al. ....... 429/17 |
| 6,190,623 B1 | 2/2001 | Sanger et al. |
| 6,221,117 B1 | 4/2001 | Edlund et al. ................ 48/76 |
| 6,242,120 B1 | 6/2001 | Herron |

OTHER PUBLICATIONS

Edlund, Dr. David and William Pledger, "Development of a Compact and Economical Steam Reformer for Fuel–Cell Systems," Fifth Grove Fuel Cell Symposium, Commonwealth Institute, London, U.K., p. 6 (Sep. 22–23, 1997).

Ledjeff–Hey, K., et al., "Compact Hydrogen Production Systems for Solid Polymer Fuel Cells," Fifth Grove Fuel Cell Symposium, Commonwealth Institute, London, U.K., p. 17 (Sep. 22–25, 1997).

Menzer, R., et al., "Fuel Processing in Fuel Cell Systems for Mobile Applications—Gasoline as Energy Carrier On–Bord," Fifth Grove Fuel Cell Symposium, Commonwealth Institute, London, U.K., (no page No.), (Sep. 22–25, 1997).

Minet, R. G., et al., "Experimental Studies of A Ceramic Membrane Reactor for the Steam/Methane Reaction at Moderate Temperatures (400–700°C.)," Symposium on Natural Gas Upgrading II Presented before The Division of Petroleum Chemistry, Inc., Meeting of American Chemical Society, San Francisco, California, U.S.A., pp. 245–248 (Apr., 1992).

Teagan, W. P., et al., "Cost Reduction of Fuel Cells for Transportation Applications—Fuel Processing Options," Fifth Grove Fuel Cell Symposium, Commonwealth Institute, London, U.K. (Sep. 22–25, 1997).

Amphlett, J. C., et al., "On Board Hydrogen Purification for Steam Reformer/PEM Fuel Cell Vehicle Power Plants," Energy Progress X, Proceedings of the $10^{th}$ World Hydrogen Energy Conference, Cocoa Beach, Florida, U.S.A., vol. 3, pp. 1681–1690 (Jun., 1994).

Edlund, David J. and William A. Pledger, "The Practical Use of Metal–Membrane Reactors for Industrial Applications," The 1995 Membrane Technology Reviews, pp. 89–97 (Nov., 1994).

Oertel, Michael, et al., "Steam Reforming of Natural Gas with Integrated Hydrogen Separation for Hydrogen Production," Chemical Engineering Techology, vol. 10, pp. 248–255 (1987).

Piwetz et al., "Hydrodesulfurization and Prereforming of Logistic Fuels for Use in Fuel Cell Applications," presented at the 1996 Fuel Cell Seminar held Nov. 17–20, 1996 in Orlando, Florida, pp. 780–783.

* cited by examiner

STEAM REFORMING METHOD AND APPARATUS INCORPORATING A HYDROCARBON FEEDSTOCK

RELATED APPLICATION

This application claims priority to co-pending U.S. Provisional Patent Application Ser. No. 60/148,520, which was filed on Aug. 12, 1999, is entitled "Steam Reforming Method and Apparatus Incorporating a Hydrocarbon Feedstock," and the complete disclosure of which is hereby incorporated by reference.

FIELD OF THE INVENTION

The invention relates generally to fuel processing systems, and more specifically to fuel processing systems that utilize a hydrocarbon feedstock.

BACKGROUND AND SUMMARY OF THE INVENTION

Purified hydrogen is used in the manufacture of many products including metals, edible fats and oils, and semiconductors and microelectronics. Purified hydrogen is also an important fuel source for many energy conversion devices. For example, fuel cells use purified hydrogen and an oxidant to produce an electrical potential. A process known as steam reforming produces by chemical reaction hydrogen and certain byproducts or impurities. A subsequent purification process removes the undesirable impurities to provide hydrogen sufficiently purified for application to a fuel cell.

In a steam reforming process, one reacts steam and a carbon-containing compound in the presence of a catalyst. Examples of suitable carbon-containing compounds include, but are not limited to, alcohols (such as methanol or ethanol) and hydrocarbons (such as methane, propane, gasoline or kerosene). Steam reforming requires an elevated operating temperature, e.g., between 250 degrees centigrade and 900 degrees centigrade, and produces primarily hydrogen and carbon dioxide, with lesser quantities of carbon monoxide also being formed. Trace quantities of unreacted reactants and trace quantities of byproducts also can result from steam reforming. Efficient operation of the fuel processor requires careful indexing and control of the ratio of water (steam) to carbon-containing feedstock.

The invented system includes a fuel processor that produces hydrogen from a variety of feedstocks. One such fuel processor is a steam reformer, which produces purified hydrogen from a carbon-containing feedstock and water. In the invented system, various mechanisms for controlling the ratio of steam to carbon-containing feedstock are disclosed. In some embodiments, the fuel processing system includes a fuel cell stack that includes at least one fuel cell adapted to produce electrical power from air (oxygen) and hydrogen gas produced by the fuel processor.

Many other features of the present invention will become manifest to those versed in the art upon making reference to the detailed description which follows and the accompanying sheets of drawings in which preferred embodiments incorporating the principles of this invention are disclosed as illustrative examples only.

DETAILED DESCRIPTION OF THE PREFERRED EMBODIMENTS AND BEST MODE OF THE INVENTION

Figure 1:
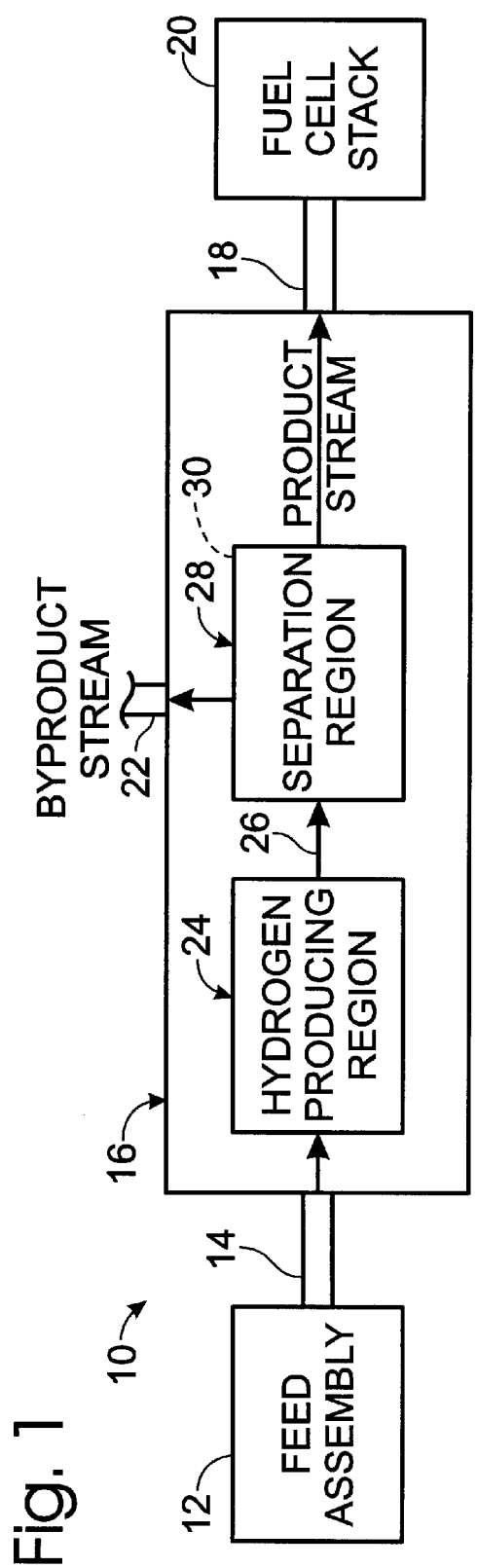
FIG. 1 is a schematic diagram of a fuel processing system according to the present invention.

A schematic example of a fuel processing assembly is shown in FIG. 1 and generally indicated at 10. Assembly 10 includes a feed assembly 12 that is adapted to deliver one or more feed streams 14 to a fuel processor 16. Fuel processor 16 receives the feed streams and produces a product hydrogen stream 18 therefrom. In addition to product hydrogen stream 18, fuel processor 16 generally produces one or more byproduct streams 22. These byproduct streams may be utilized for fuel, heat exchange, or feed. Alternatively, these streams may be harvested for use in other applications.

Fuel processor 16 is a device or assembly of devices adapted to produce hydrogen gas through any suitable mechanism from a single or multi-component feedstock comprising one or more feed streams. An example of a suitable mechanism for producing hydrogen gas is steam reforming, in which hydrogen gas is produced from a carbon-containing feedstock and water. Examples of suitable steam reforming units are disclosed in U.S. Pat. Nos. 5,861,137 and 5,997,594, and U.S. patent application Ser. No. 09/190,917, the disclosures of which are hereby incorporated by reference.

Product hydrogen stream 18 may be stored in a suitable storage device, such as a hydride bed or storage tank, or delivered for use in processes requiring purified hydrogen gas. For example, in FIG. 1, product hydrogen stream 18 is shown being delivered to a fuel cell stack 20. Fuel cell stack 20 includes at least one fuel cell, and typically includes multiple fuel cells coupled together. The fuel cell stack receives hydrogen gas from the fuel processor and produces an electric current therefrom as the hydrogen gas is reacted with oxygen to form water. The electric current produced by the fuel cell stack is then used to meet the electric load applied by one or more associated devices, such as vehicles, households, generators, boats, etc. Examples of suitable fuel cells include proton exchange membrane (PEM) fuel cells and alkaline fuel cells.

Fuel processor 16 includes a hydrogen producing region 24, in which a hydrogen containing stream, or mixed gas stream, 26 is produced from the feed streams. The hydrogen-containing stream typically contains impurities, and therefore is delivered to a separation region, or purification region, 28, where the stream is purified. In separation region 28, the hydrogen-containing stream is separated into product hydrogen stream 18 and one or more byproduct streams 22 by any suitable pressure-driven separation process. As an illustrative example, separation region 28 may include a membrane module 30, which contains one or more hydrogen permeable metal membranes, such as those discussed herein. Another example of a suitable pressure-separation process is pressure swing absorption (PSA). Therefore, region 28 may alternatively include suitable structure for performing pressure swing absorption.

Region 28 may also be referred to as a purification assembly or separation assembly. Separation region 28 is in communication with fuel processor 16 and adapted to receive the mixed gas stream containing hydrogen gas (and other components) from hydrogen producing region 24.

Separation region 28 may be contained within fuel processor 16, such as within the housing of the fuel processor. Alternatively, region 28 may be mounted on the housing of the fuel processor. In a further variation, separation region 28 may be physically separated from the fuel processor, but still in fluid communication therewith, such as through the use of piping or other fluid transportation lines or mechanisms.

An example of a membrane module formed from a plurality of hydrogen-selective metal membranes is disclosed in U.S. patent application Ser. No. 09/291,447, now U.S. Pat. No. 6,221,117 which was filed on Apr. 13, 1999, is entitled "Fuel Processing System," and the complete disclosure of which is hereby incorporated by reference. In that application, a plurality of generally planar membranes are assembled together into a membrane module having flow channels through which an impure gas stream is delivered to the membranes, a purified gas stream is harvested from the membranes and a byproduct stream is removed from the membranes. Gaskets, such as flexible graphite gaskets, are used to achieve seals around the feed and permeate flow channels.

The thin, planar, hydrogen-permeable membranes are preferably composed of palladium alloys, most especially palladium with 35 wt % to 45 wt % copper. These membranes are typically formed from a thin foil that is approximately 0.001 inches thick. It is within the scope of the present invention, however, that the membranes may be formed from hydrogen-selective metals and metal alloys other than those discussed above and that the membranes may have thicknesses that are larger or smaller than discussed above. For example, the membrane may be made thinner, with commensurate increase in hydrogen flux, such as by the above-described etching process. The hydrogen-permeable membranes may be arranged in any suitable configuration, such as arranged in pairs around a common permeate channel as is disclosed in the incorporated patent applications.

A fuel processor that utilizes a steam-reforming process to produce hydrogen must be capable of combining steam and the carbon-containing feedstock in the proper ratio and at the proper pressure. If an alcohol (such as methanol or ethanol) is the carbon-containing feedstock, the alcohol and water may be mixed prior to being pumped into the fuel processor to ensure the proper steam to alcohol ratio. This is possible because methanol and ethanol are broadly miscible with water. With hydrocarbon feedstocks, and other feedstocks that are not miscible with water, premixing is not an option because hydrocarbons are immiscible with water. This fact means the carbon-containing feedstock (such as methane or propane) and water must be mixed as a vapor. One solution to this problem is to use two separate pumps (or a pump and compressor) to deliver the water and feedstock to two separate vaporizers/heaters and then mix the hot vapors at the inlet to the reforming section. However, this approach requires close control of the water and feedstock flow rates in order to maintain the proper ratio of steam to carbon-containing feedstock. Another method is the subject of this invention.

Figure 2:
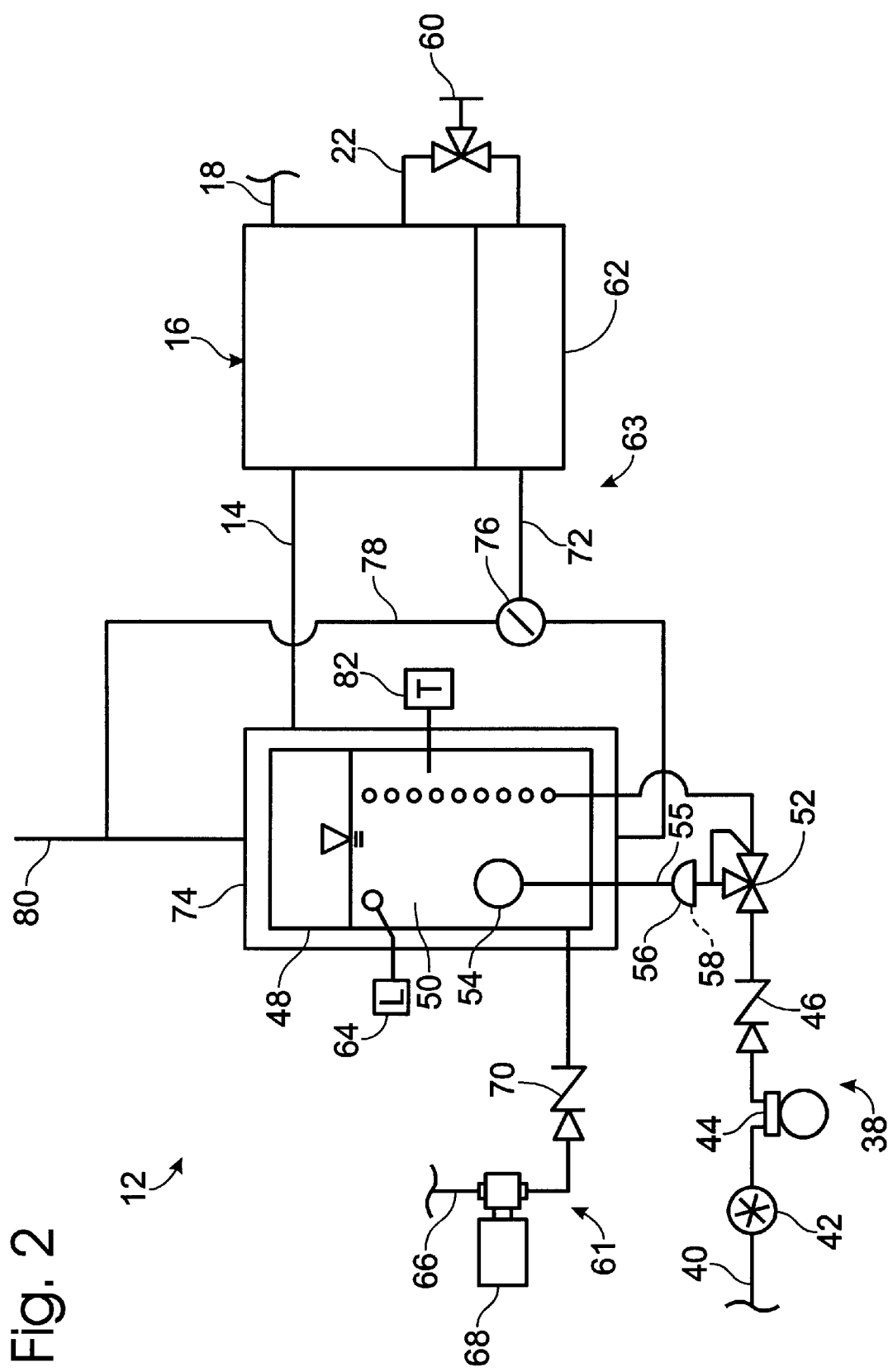
FIG. 2 is a schematic diagram of a fuel processing system showing in more detail a feed assembly according to the present invention.

In FIG. 2, an embodiment of feed assembly 12 is shown in more detail. Assembly 12 is adapted to deliver a feed stream 14 formed of steam and a carbon-containing feedstock, such as a hydrocarbon vapor to fuel processor 16. In assembly 12, a gaseous carbon-containing feedstock is bubbled through a water reservoir, which results in mixing of the carbon-containing feedstock vapors with water vapor (steam). It should be understood that as used herein, the term "gaseous carbon-containing feedstock" is meant to include carbon-containing feedstocks that are normally gases, as well as carbon-containing feedstocks that are normally liquid and which are vaporized at the operating temperatures and pressures of the reservoir. The proportion of steam in the mixture is determined by the ratio of the water saturation vapor pressure to the delivery pressure. Thus, for a fixed delivery pressure, the proportion of steam is controlled by the temperature of the water in the reservoir. Similarly, for a fixed temperature in reservoir 48, the proportion of steam is controlled by the difference, or differential, between the delivery pressure of stream 40 and the water saturation vapor pressure. Typically, a temperature in the range of approximately 185° C. and approximately 195° C. has proven effective for the reservoir, however, temperatures outside of this range may be used.

Stoichiometrically, the ideal molar ratio of water to carbon in feed stream 14 is 2:1. However, in actual application a ratio in the range of approximately 2:1 to approximately 5:1 has proven effective, with a preferred ratio being in the range of approximately 2.5:1 and approximately 3.5:1, and an even more preferred ratio being 3:1. Too much carbon-containing feedstock in feed stream 14 increases the likelihood of carbon depositing on the reforming catalyst used in the steam reformer, namely, fuel processor 16. Too much water in feed stream 14 increases the heat requirements of fuel processor 16 to vaporize the excess water.

FIG. 2 shows a process diagram for the mixing system and the fuel processor using mostly mechanical flow control components. A volatile carbon-containing feedstock is supplied to feed assembly 12 in stream 40 by a carbon-containing feedstock delivery system 38. Typically, stream 40 is supplied at low pressure. Examples of suitable carbon-containing feedstocks include methane and propane, although other hydrocarbons, mixtures of hydrocarbons and other carbon-containing compounds may be used and are within the scope of the present invention. The carbon-containing feedstock should be volatile, and more specifically should be gaseous at the operating temperature and pressure at which the feedstock is introduced to the subsequently described water reservoir. If desired, a flow meter 42 can be used to measure the flow rate of the carbon-containing feedstock entering the feed assembly.

In FIG. 2, delivery system 38 includes a diaphragm pump or other suitable compressor 44 that compresses stream of carbon-containing feedstock to a pressure above the delivery pressure to the fuel processor. To prevent back flow that could pressurize the source, a check valve 46 is preferably installed after the compressor. It should be understood that it is within the scope of the present invention that any other suitable mechanism for providing a carbon-containing feed stream at a pressure greater than the pressure in reservoir 48 may be used. For example, if stream 40 is a stored as a compressed liquid, then a pump may be used, with the stream being vaporized prior to mixing with the water in the reservoir. Stream 40 is delivered to a water reservoir 48 containing a volume of water 50.

The delivery pressure to fuel processor 16 is controlled by a regulator 52. An example of a suitable regulator 52 is a dome-loaded, positive-biased, pressure-reducing regulator. Regulator 52 communicates with a sensor 54 adapted to measure the saturation pressure of the water in reservoir 48. An example of a suitable sensor 54 is a mixed-phase, water-filled bulb inside reservoir 48. Sensor 54 is connected to the dome 56 of the delivery regulator as a pressure reference. A spring 58 inside regulator 52 then adds positive bias to raise the delivery pressure above the reference pressure by a determined amount. In experiments, a pressure in the range of approximately 10 psi to approximately 20 psi greater than the reference pressure has proven effective, although other delivery pressures may be used and are within the scope of the present invention. This allows the delivery pressure to track with changes in the saturation pressure of the water. Other suitable sensors may be used in place of dome 56. For example, sensor 54 may take the form of a pressure transducer in communication with regulator 52.

After leaving regulator 52, the carbon-containing feedstock stream 40 is bubbled through water reservoir 48 to ensure complete mixing with the water vapor (steam). Feed stream 14 exists reservoir 48 and is delivered to fuel processor 16. As discussed, reservoir 48 is typically maintained at a pressure sufficiently greater than the operating pressure of the fuel processor to account for losses as the stream is delivered to the fuel processor. For example, reservoir 48 may be maintained at a pressure in the range of approximately 200 psi and approximately 250 psi.

As discussed, fuel processor 16 produces a product stream 18 and at least one byproduct, or waste reformate, stream 22. The waste reformate stream passes through a needle valve 60. In the embodiment shown, it is possible to regulate the flow of gas through the entire system with this needle valve, which preferably is selectively adjustable to allow this level of control. Valve 60 may be adjusted by a user, or communicate with a controller that selectively adjusts the valve.

In the embodiment of the fuel processing system shown in FIG. 2, stream 22 is delivered to a combustion chamber 62. Chamber 62 may form a part of fuel processor 16, either as a separate unit or directly coupled to or integrated into the fuel processor. Alternatively, stream 22 may be delivered to a burner or combustion unit that is otherwise independent of the fuel processor. It is also within the scope of the invention that byproduct stream 22 may be vented, stored or delivered to another downstream device other than combustion chamber 62.

To maintain the desired level of water in reservoir 48, the fuel processing system includes a water delivery system 61. The water delivery system includes a sensor 64 adapted to measure the level (or volume) of water in the reservoir. As water evaporates from the reservoir, the level drops until sensor 64 is activated. Activation of sensor 64 causes a stream 66 of additional water to be delivered to reservoir 48 from a supply (not shown), such as via pump 68. Alternatively, a valve may be used if the water stream is provided at suitable pressure for delivery upon opening of the valve. Sensor 64 may communicate with pump 68 or a suitable valve assembly through any suitable mechanism. For example, sensor 64 may communicate directly with the pump or valve to actuate the pump or valve when the sensor is activated and to deactivate the pump or valve when the desired level is reached. Alternatively, a controller may monitor the level measured by sensor 64 and actuate the pump or valve if the measured level falls below a stored threshold value. Typically, this additional water is delivered from a low-pressure source and passed through a check valve 70 prior to delivery to reservoir 48.

Reservoir 48 is preferably heated, such as by a heating assembly 63. Assembly 63 is adapted to heat the water in the reservoir, such as through heat exchange with any suitable heat source. An example of a suitable heat source is a hot exhaust stream 72 from the fuel processor 16 (or an associated combustion unit 62). As shown, stream 72 is delivered to a shell 74 that at least partially, or completely, surrounds reservoir 48. To prevent overheating, a temperature controlled diverter valve 76 controls the amount of exhaust that is routed through the shell. The excess exhaust passes through a bypass stream 78 to a vent 80. A temperature sensor or thermocouple 82 measures the temperature of the mixing bath in reservoir 48. Sensor 82 communicates with diverter valve 76 through any suitable mechanism. Examples of suitable mechanisms include direct communication and communication through a controller, such as discussed above.

In some embodiments of the invention, a heating assembly is not necessary. For example, reservoir 48 may be located in an environment that is normally maintained at a temperature sufficient to maintain the reservoir at a desired temperature or within a desired temperature range. An Example of such an environment includes locating reservoir near other equipment, such a fuel processor 16, that radiates sufficient heat to heat the water in reservoir 48. Preferably, however, the system includes at least an auxiliary heating assembly to maintain the temperature of reservoir at a selected temperature or within selected temperature ranges through heating or cooling.

Figure 3:
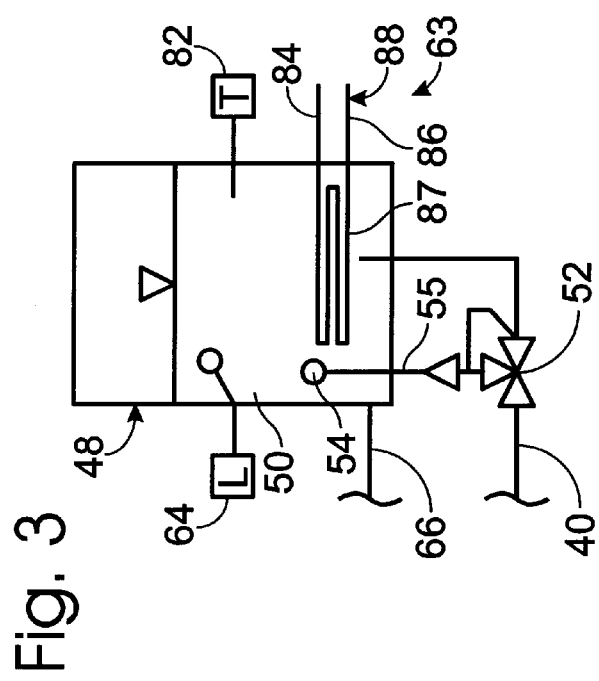
FIG. 3 is a schematic diagram showing another embodiment of the reservoir shown in FIG. 2.

Reservoir 48 may also be heated by heat exchange with streams that pass through the reservoir, as opposed to passing to a jacket or shell surrounding the reservoir. An example of such a reservoir is shown in FIG. 3, in which a heating stream 84 passes through conduits 87 in reservoir 48 and exits as stream 86. Streams 84 and 86 may form part of a heating/cooling fluid loop 88. For example, fuel cell stack 20 often employs a cooling fluid loop that may also be used to heat reservoir 48. Alternatively, stream 86 may be exhausted or sent to a downstream device for disposal, use, storage or the like.

Other methods may be used to heat water reservoir 48. Examples of other suitable methods for heating reservoir 48 include electric resistance heaters, burners and combustion chambers independent of fuel processor 16. Resistance heating may be accomplished in any suitable fashion, such as by applying heat to the exterior of the reservoir, which is preferably insulated, or through heating rods extending into the reservoir.

Figure 4:
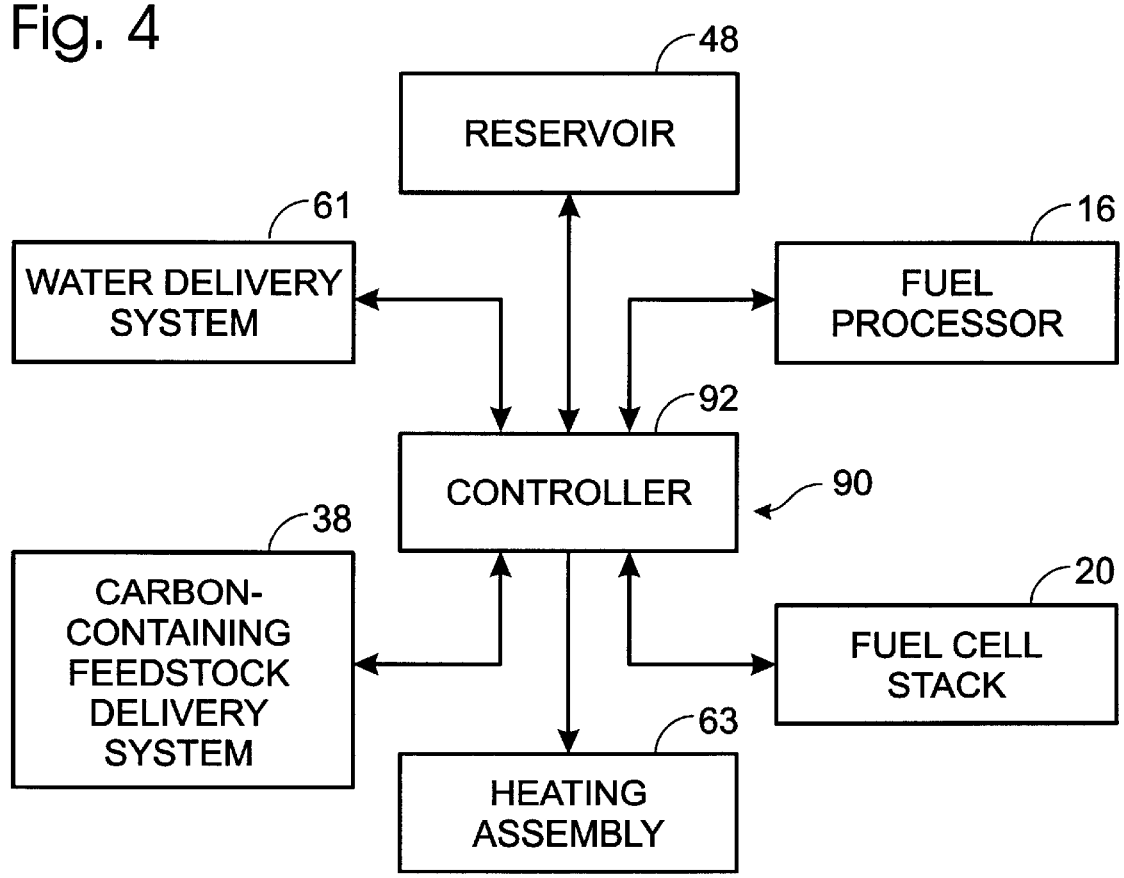
FIG. 4 is a schematic diagram of another embodiment of the fuel processing system according to the present invention.

As discussed, the fuel processing system may include a control system to control the operation of some or all of the components of system 10, including some or all of the components of feed assembly 12. A fuel processing system that includes a control system is schematically illustrated in FIG. 4, in which the control system is indicated generally at 90.

As shown, control system includes a controller 92 in communication with fuel processor 16, fuel cell stack 20, carbon-containing feedstock delivery system 38, reservoir 48, water delivery system 61, and heating assembly 63. It should be understood that the control system may include any or all of these communication lines, and that the system may further communicate with components not shown in FIG. 4. Furthermore, via controller 92, the components of fuel processing system 10 may communicate with each other.

Communication may be either one- or two-directional, with the controller receiving information from the communicating unit and/or directing the operation of that unit or another portion of the fuel processing system responsive to the received information. The communication described herein may be via any suitable linkage for sending and/or receiving signals between the associated elements of the system. For example, any suitable mechanical linkage, or wired or wireless electronic linkage may be used. For example, responsive to the fluid level detected by level sensor 64, the controller may actuate pump 68 or another suitable portion of water delivery system 61 to cause more water to be added to reservoir 48. Similarly, with the addition of water, controller 90 may actuate heating assembly 63 to cause additional heat to be delivered to reservoir 48.

By comparing the measured values to user-inputs or stored values, the controller then selectively controls the operation of the feed assembly and/or other components of the fuel processing system. For example, if a measured value for a particular variable exceeds (either above or below) a threshold value or range of acceptable values, the controller may responsively actuate one or more components of the fuel processing system to bring the measured value, or variable, back to an acceptable value.

Control system 90 controls the ratio of carbon-containing feedstock to water in the feed stream to the fuel processor, such as in response to user-inputs or stored values establishing a desired ratio or acceptable range of ratios. As discussed, this ratio is dependent upon the temperature of water in reservoir 48. Therefore, responsive to temperatures measured by sensor 82, the controller may actuate regulator 52 to adjust the delivery pressure of stream 55 responsive to these temperature changes. Similarly, the controller may regulate this ratio by controlling heating assembly 63 and/or water delivery system 61 to control the temperature of water in reservoir 48, thereby also controlling the ratio of carbon-containing feedstock to water in the feed stream from the reservoir. Control system 90 may control other aspects of the fuel processing system in addition to feed assembly 12.

INDUSTRIAL APPLICABILITY

The fuel processing system described herein is applicable in any situation where hydrogen gas is to be produced from one or more feedstocks. It is particularly applicable when hydrogen gas is to be produced from a carbon-containing feedstock, such as a hydrocarbon, that is immiscible with water.

It is believed that the disclosure set forth above encompasses multiple distinct inventions with independent utility. While each of these inventions has been disclosed in its preferred form, the specific embodiments thereof as disclosed and illustrated herein are not to be considered in a limiting sense as numerous variations are possible. The subject matter of the inventions includes all novel and non-obvious combinations and subcombinations of the various elements, features, functions and/or properties disclosed herein. Where the claims recite "a" or "a first" element or the equivalent thereof, such claims should be understood to include incorporation of one or more such elements, neither requiring nor excluding two or more such elements.

The following claims recite certain combinations and subcombinations that are directed to one of the disclosed inventions and are believed to be novel and non-obvious. Inventions embodied in other combinations and subcombinations of features, functions, elements and/or properties may be claimed through amendment of the present claims or presentation of new claims in this or a related application. Such amended or new claims, whether they are directed to a different invention or directed to the same invention, whether different, broader, narrower or equal in scope to the original claims, are also regarded as included within the subject matter of the inventions of the present disclosure.

We claim:

1. A fuel processing system, comprising:
   a fuel processor adapted to produce a product stream containing hydrogen gas from a feed stream containing a carbon-containing feedstock and water; and
   a feed assembly adapted to deliver the feed stream to the fuel processor, wherein the feed assembly comprises:
   a reservoir adapted to hold a volume of liquid water having a surface, the reservoir including a water inlet through which a supply of water is added to the reservoir, a carbon-containing feedstock inlet through which a gaseous stream of carbon-containing feedstock is added to the reservoir, and an outlet through which the feed stream is delivered to the fuel processor, wherein the carbon-containing feedstock inlet is positioned to introduce the carbon-containing feedstock below the surface of the volume of liquid water;
   a regulator adapted to control the pressure of the stream of carbon-containing feedstock delivered to the reservoir, wherein the regulator is in communication with a sensor adapted to measure at least one of the pressure of the water in the reservoir and the temperature of the water in the reservoir, and further wherein the regulator is adapted to control the pressure of the stream of the carbon-containing feedstock responsive at least in part to inputs from the sensor; and
   a carbon-containing feedstock delivery system adapted to deliver the stream of carbon-containing feedstock to the carbon-containing feedstock inlet of the reservoir.

2. The fuel processing system of claim 1, wherein the reservoir is a tank having an internal compartment with a first region adapted to receive and contain the volume of liquid water, and a second region that is above the first region and does not contain the volume of liquid water.

3. The fuel processing system of claim 1, wherein the regulator is adapted to control the pressure of the stream of carbon-containing feedstock responsive to changes in the pressure of the water in the reservoir.

4. The fuel processing system of claim 1, wherein the regulator is adapted to control the pressure of the stream of carbon-containing feedstock responsive to changes in the temperature of the water in the reservoir.

5. The fuel processing system of claim 1, wherein the sensor includes a pressure sensor adapted to measure the saturation pressure of the water in the reservoir.

6. The fuel processing system of claim 5, wherein the regulator is in communication with the pressure sensor and is adapted to control the pressure of the stream of the carbon-containing feedstock to be greater than the pressure of water in the reservoir.

7. The fuel processing system of claim 5, wherein the regulator is in communication with the pressure sensor and is adapted to control the pressure of the stream of the carbon-containing feedstock to be greater than the pressure of water in the reservoir by a determined increment.

8. The fuel processing system of claim 1, wherein the regulator is adapted to control the ratio of water and carbon-containing feedstock in the feed stream by controlling the pressure at which the stream of the carbon-containing feedstock is delivered to the reservoir.

9. The fuel processing system of claim 1, further including a heating assembly adapted to heat the water in the reservoir.

10. The fuel processing system of claim 9, wherein the heating assembly is adapted to heat the water in the reservoir through heat exchange with a heated fluid stream.

11. The fuel processing system of claim 10, wherein the fuel processor includes a heated exhaust stream and the heated fluid stream includes the heated exhaust stream from the fuel processor.

12. The fuel processing system of claim 10, wherein the heated fluid stream includes an exhaust stream from a combustion chamber.

13. The fuel processing system of claim 10, wherein the fuel processing system further includes a combustion chamber with an exhaust stream and the heated fluid stream includes the exhaust stream from the combustion chamber.

14. The fuel processing system of claim 10, wherein the fuel processing system further includes a fuel cell stack including at least one fuel cell adapted to produce electrical power from the product stream, wherein the fuel cell stack includes a cooling fluid stream, and further wherein the heated fluid stream includes the cooling fluid stream from the fuel cell stack.

15. The fuel processing system of claim 10, wherein the heated fluid stream includes an exhaust stream from a burner.

16. The fuel processing system of claim 10, wherein the reservoir includes one or more conduits passing through the reservoir and not in fluid communication with the volume of liquid water, and the heating assembly is adapted to deliver the heated fluid stream through the conduits.

17. The fuel processing system of claim 10, wherein the reservoir includes a shell surrounding at least a portion of the reservoir, wherein the shell is spaced away from the reservoir to define a cavity therebetween, and further wherein the heating assembly is adapted to deliver the heated fluid stream to the cavity.

18. The system of claim 9, further including a controller adapted to regulate the delivery of heat to the reservoir by the heating assembly responsive at least in part to the temperature of the water in the reservoir.

19. The fuel processing system of claim 1, further including a fuel cell stacked including at least one fuel cell adapted to receive the product stream and to produce electrical power therefrom.

20. The fuel processing system of claim 1, further including a control system in communication with the regulator and adapted to control the ratio of water and the carbon-containing feedstock in the feed stream.

21. The fuel processing system of claim 20, wherein the control system includes a controller adapted to control the pressure of the stream of carbon-containing feedstock delivered to the reservoir.

22. The fuel processing system of claim 21, wherein the controller communicates with a sensor adapted to measure the saturation pressure of the water in the reservoir, and the controller is adapted to control the pressure of the stream of carbon-containing feedstock responsive at least in part to inputs from the sensor adapted to measure the saturation pressure of the water in the reservoir.

23. The fuel processing system of claim 22, wherein the controller is adapted to index the pressure of the stream of the carbon-containing feedstock to the saturation pressure of the water in the reservoir.

24. The fuel processing system of claim 22, wherein the controller is adapted to maintain the pressure of the stream of the carbon-containing feedstock in excess of the saturation pressure of the water in the reservoir.

25. The fuel processing system of claim 21, wherein the control system includes a sensor adapted to measure the temperature of the water in the reservoir, and the controller is adapted to control the pressure of the stream of carbon-containing feedstock responsive at least in part to inputs from the sensor adapted to measure the saturation pressure of the water in the reservoir.

26. The fuel processing system of claim 21, wherein the controller is adapted to index the pressure of the stream of the carbon-containing feedstock to the temperature of the water in the reservoir.

27. The fuel processing system of claim 21, wherein the controller is adapted to control the pressure of the stream of carbon-containing feedstock relative to the temperature of the water in the reservoir.

28. The fuel processing system of claim 1, wherein the carbon-containing feedstock includes at least one hydrocarbon.

29. The fuel processing system of claim 1, wherein the carbon-containing feedstock includes at least one of methane and propane.

30. The fuel processing system of claim 1, wherein the fuel processor includes a steam reformer.

31. The fuel processing system of claim 9, further including a water delivery system adapted to deliver the volume of liquid water to the reservoir, wherein the volume of liquid water has a temperature as it is delivered to the reservoir by the water delivery system, and further wherein the heating assembly is adapted to heat the volume of liquid water to a temperature greater than the temperature of the water when it was delivered to the reservoir by the water delivery system.

32. The fuel processing system of claim 1, wherein the fuel processor further includes a hydrogen-producing region adapted to receive the feed stream and to produce a mixed gas stream containing hydrogen gas therefrom.

33. The fuel processing system of claim 32, wherein the fuel processor further includes a separation region adapted to receive the mixed gas stream and to produce the product stream and a byproduct stream therefrom.

34. The fuel processing system of claim 33, wherein the separation region includes at least one hydrogen-permeable membrane, and further wherein the product stream is formed from a portion of the mixed gas stream that passes through the at least one membrane and the byproduct stream is formed from a portion of the mixed gas stream that does not pass through the membrane.

35. The fuel processing system of claim 34, wherein at least one of the membranes is a hydrogen-selective membrane containing palladium.

36. The fuel processing system of claim 33, wherein the separation region is adapted to produce the product stream from the mixed gas stream via a pressure swing absorption process.

37. The fuel processing system of claim 1, wherein the water inlet is below the surface.

38. The fuel processing system of claim 1, wherein the water inlet is below the carbon-containing feedstock inlet.

39. The fuel processing system of claim 6, wherein the carbon-containing feedstock includes at least one hydrocarbon.

40. The fuel processing system of claim 8, wherein the carbon-containing feedstock includes at least one hydrocarbon.

41. The fuel processing system of claim 20, wherein the carbon-containing feedstock includes at least one hydrocarbon.

42. A fuel processing system, comprising:
   a fuel processor adapted to produce a product stream containing hydrogen gas from a feed stream containing a carbon-containing feedstock and water; and
   a feed assembly adapted to deliver the feed stream to the fuel processor, wherein the feed assembly comprises:
      a reservoir adapted to hold a volume of liquid water having a surface, the reservoir including a water inlet through which a supply of water is added to the reservoir, a carbon-containing feedstock inlet through which a gaseous stream of carbon-containing feedstock is added to the reservoir, and an outlet through which the feed stream is delivered to the fuel processor, wherein the carbon-containing feedstock inlet is positioned to introduce the carbon-containing feedstock below the surface of the volume of liquid water;

a carbon-containing feedstock delivery system adapted to deliver the stream of carbon-containing feedstock to the carbon-containing feedstock inlet of the reservoir; and control system adapted to control the pressure of the stream of carbon-containing feedstock delivered to the reservoir, wherein the control system includes a controller adapted to control the pressure of the stream of carbon-containing feedstock delivered to the reservoir, wherein the controller is in communication with at least one sensor adapted to measure at least one of the pressure of the water in the reservoir and the temperature of the water in the reservoir, and further wherein the controller is adapted to control the pressure of the stream of carbon-containing feedstock delivered to the reservoir responsive at least in part to inputs from the at least one sensor.

43. The fuel processing system of claim 42, wherein the reservoir is a tank having an internal compartment with a first region adapted to receive and contain the volume of liquid water, and a second region that is above the first region and does not contain the volume of liquid water.

44. The fuel processing system of claim 42, wherein the controller communicates with a sensor adapted to measure the saturation pressure of the water in the reservoir, and the controller is adapted to control the pressure of the stream of carbon-containing feedstock responsive at least in part to inputs from the sensor adapted to measure the saturation pressure of the water in the reservoir.

45. The fuel processing system of claim 44, wherein the controller is adapted to index the pressure of the stream of the carbon-containing feedstock to the saturation pressure of the water in the reservoir.

46. The fuel processing system of claim 44, wherein the controller is adapted to maintain the pressure of the stream of the carbon-containing feedstock in excess of the saturation pressure of the water in the reservoir.

47. The fuel processing system of claim 42, wherein the control system includes a sensor adapted to measure the temperature of the water in the reservoir, and the controller is adapted to control the pressure of the stream of carbon-containing feedstock responsive at least in part to inputs from the sensor adapted to measure the saturation pressure of the water in the reservoir.

48. The fuel processing system of claim 47, wherein the controller is adapted to index the pressure of the stream of the carbon-containing feedstock to the temperature of the water in the reservoir.

49. The fuel processing system of claim 47, wherein the controller is adapted to control the pressure of the stream of carbon-containing feedstock relative to the temperature of the water in the reservoir.

50. The fuel processing system of claim 42, wherein the feed assembly further includes a liquid sensor adapted to measure the volume of liquid water in the reservoir, and the controller is in communication with the liquid sensor and adapted to actuate a water delivery system to deliver more water to the reservoir responsive at least in part to inputs from the liquid sensor.

51. The fuel processing system of claim 42, further including a heating assembly adapted to heat the water in the reservoir.

52. The fuel processing system of claim 51, wherein the heating assembly is adapted to heat the water in the reservoir through heat exchange with a heated fluid stream.

53. The fuel processing system of claim 52, wherein the fuel processor includes a heated exhaust stream and the heated fluid stream includes the heated exhaust stream from the fuel processor.

54. The fuel processing system of claim 52, wherein the fuel processing system further includes a fuel cell stack including at least one fuel cell adapted to produce electrical power from the product stream, wherein the fuel cell stack includes a cooling fluid stream, and further wherein the heated fluid stream includes the cooling fluid stream from the fuel cell stack.

55. The fuel processing system of claim 52, wherein the reservoir includes one or more conduits passing through the reservoir, and the heating assembly is adapted to deliver the heated fluid stream through the conduits.

56. The fuel processing system of claim 52, wherein the reservoir includes a shell surrounding at least a portion of the reservoir, wherein the shell is spaced away from the reservoir to define a cavity therebetween, and further wherein the heating assembly is adapted to deliver the heated fluid stream to the cavity.

57. The fuel processing system of claim 51, wherein the controller is further adapted to regulate the delivery of heat to the reservoir by the heating assembly responsive at least in part to the temperature of the water in the reservoir.

58. The fuel processing system of claim 51, further including a water delivery system adapted to deliver the volume of liquid water to the reservoir, wherein the volume of liquid water has a temperature as it is delivered to the reservoir by the water delivery system, and further wherein the heating assembly is adapted to heat the volume of liquid water to a temperature greater than the temperature of the water when it was delivered to the reservoir by the water delivery system.

59. The fuel processing system of claim 42, wherein the fuel processor further includes a hydrogen-producing region adapted to receive the feed stream and to produce a mixed gas stream containing hydrogen gas therefrom, and a separation region adapted to receive the mixed gas stream and to produce the product stream and a byproduct stream therefrom.

60. The fuel processing system of claim 59, wherein the separation region includes at least one hydrogen-permeable membrane, and further wherein the product stream is formed from a portion of the mixed gas stream that passes through the at least one membrane and the byproduct stream is formed from a portion of the mixed gas stream that does not pass through the membrane.

61. The fuel processing system of claim 60, wherein at least one of the membranes is a hydrogen-selective membrane containing palladium.

62. The fuel processing system of claim 59, wherein the separation region is adapted to produce the product stream from the mixed gas stream via a pressure swing absorption process.

63. The fuel processing system of claim 42, wherein the water inlet is below the surface.

64. The fuel processing system of claim 42, wherein the water inlet is below the carbon-containing feedstock inlet.

65. The fuel processing system of claim 42, wherein the carbon-containing feedstock includes at least one hydrocarbon.

66. The fuel processing system of claim 62, wherein the carbon-containing feedstock includes at least one of methane and propane.

\* \* \* \* \*

UNITED STATES PATENT AND TRADEMARK OFFICE
CERTIFICATE OF CORRECTION

PATENT NO. : 6,375,906 B1
DATED : April 23, 2002
INVENTOR(S) : David J. Edlund et al.

It is certified that error appears in the above-identified patent and that said Letters Patent is hereby corrected as shown below:

Column 11,
Line 12, before "control system" please insert -- a --.

Column 12,
Line 63, please delete "claim 62" and insert -- claim 42 -- therefor.

Signed and Sealed this

Tenth Day of June, 2003

JAMES E. ROGAN
*Director of the United States Patent and Trademark Office*

UNITED STATES PATENT AND TRADEMARK OFFICE
CERTIFICATE OF CORRECTION

PATENT NO.      : 6,375,906 B1
DATED           : April 23, 2002
INVENTOR(S)     : David J. Edlund and Thomas G. Herron It is certified that error appears in the above-identified patent and that said Letters Patent is hereby corrected as shown below:

Column 9,
Line 31, after "The" please insert -- fuel processing --.

Signed and Sealed this

Fifth Day of August, 2003

JAMES E. ROGAN
*Director of the United States Patent and Trademark Office*